S. CILETTI.
PERCOLATOR.
APPLICATION FILED NOV. 19, 1914.

1,171,022.

Patented Feb. 8, 1916.
3 SHEETS—SHEET 1.

WITNESSES:
Howard P. King
Janet A. Ayers

INVENTOR:
Stanislao Ciletti,
BY
Russell M. Everett
ATTORNEY.

S. CILETTI.
PERCOLATOR.
APPLICATION FILED NOV. 19, 1914.
1,171,022.
Patented Feb. 8, 1916.
3 SHEETS—SHEET 2.
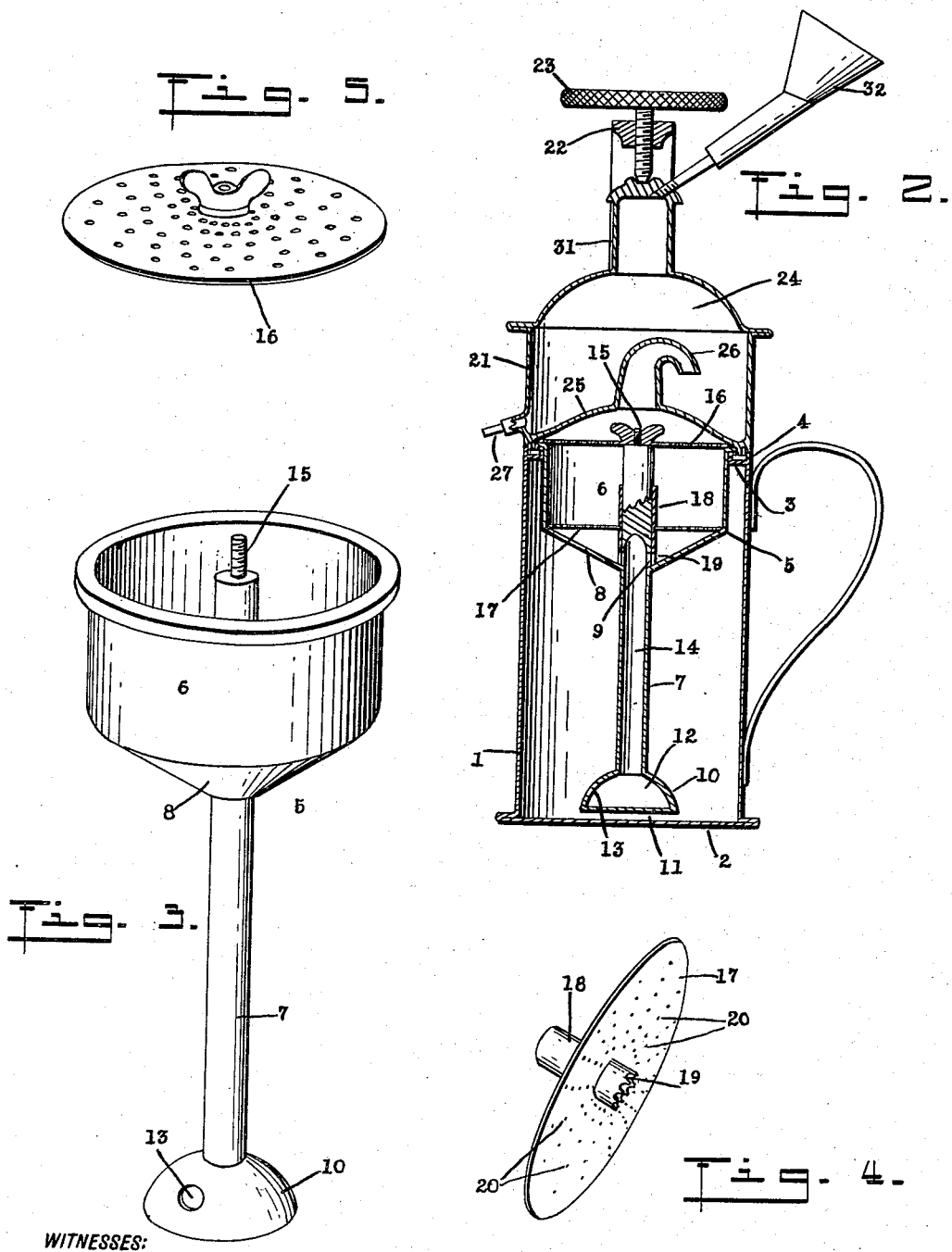
WITNESSES:
Howard P. King
Janet A. Ayers
INVENTOR:
Stanislao Ciletti,
BY
Russell M. Everett,
ATTORNEY.

S. CILETTI.
PERCOLATOR.
APPLICATION FILED NOV. 19, 1914.

1,171,022.

Patented Feb. 8, 1916.
3 SHEETS—SHEET 3.

WITNESSES:
Howard P. King
Janet A. Ayers

INVENTOR:
Stanislao Ciletti,
BY
Russell M. Everett
ATTORNEY.

UNITED STATES PATENT OFFICE.

STANISLAO CILETTI, OF NEWARK, NEW JERSEY.

PERCOLATOR.

1,171,022.  Specification of Letters Patent.  Patented Feb. 8, 1916.

Application filed November 19, 1914. Serial No. 872,965.

*To all whom it may concern:*

Be it known that I, STANISLAO CILETTI, a citizen of the United States, and a resident of Newark, in the county of Essex and State of New Jersey, have invented certain Improvements in Percolators, of which the following is a specification.

The objects of this invention are to provide an improved percolator; to keep the water and coffee or other grounds separate until the water boils; to allow only one passage of the water through the grounds; to retain water in the bottom of the percolator after the percolating operation is complete; to thus allow steam to be formed by continued heating; to indicate by means of a signal when the water has been discharged through the grounds; to discharge the beverage as soon as made; to provide a novel spout for discharging the beverage directly into a plurality of cups; to render the interior of the percolator accessible for readily cleaning the same; to secure simplicity of construction and operation, and to obtain other advantages and results as may be brought out in the following description.

Figure 1:
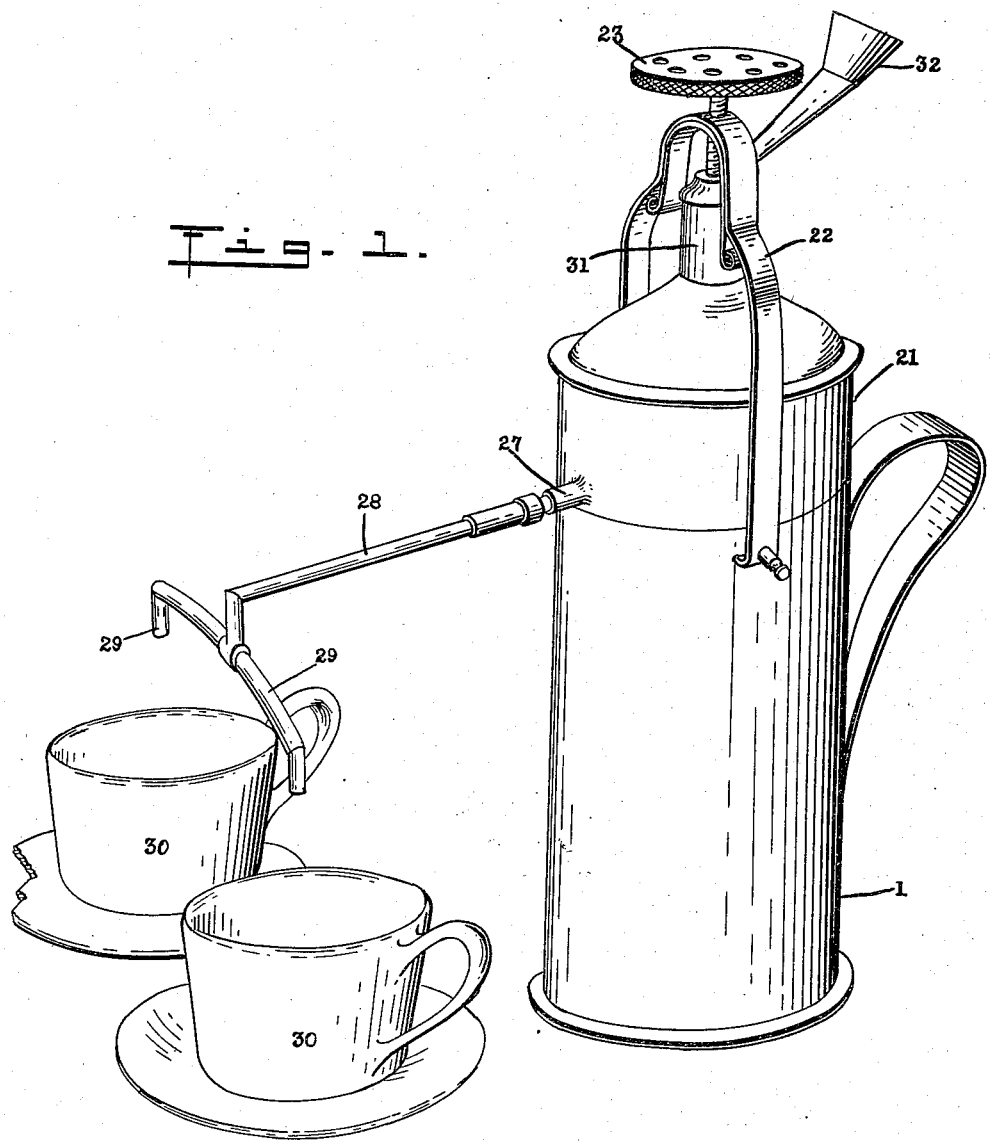
Figure 5:
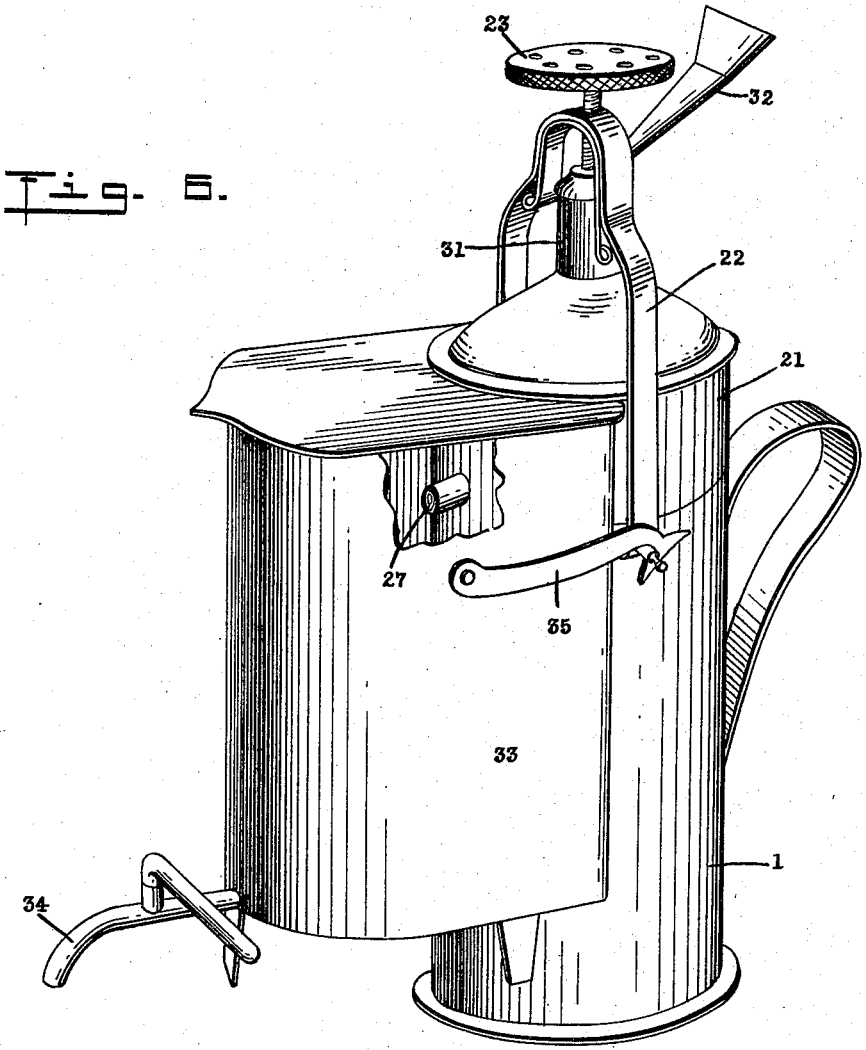

Referring to the accompanying drawings, in which like numerals of reference indicate the same parts throughout the several views, Figure 1 is a perspective view of a percolator ready for use constructed according to my invention; Fig. 2 is a vertical section through the same; Fig. 3 is a perspective view of the vessel for containing the grounds; Fig. 4 is a certain bottom plate for supporting the grounds within said vessel; Fig. 5 is a top plate for said vessel, and Fig. 6 is a perspective view similar to Fig. 1 showing a reservoir in place of the spout.

In the specific embodiment of the invention illustrated in said drawings, the reference numeral 1 indicates a suitable water-containing vessel here shown cylindrical in shape with a closed bottom 2 under which a suitable fire or source of heat supply may be placed. The upper end of this container 1 is preferably open, providing a wide mouth substantially the entire diameter of the container, giving ready access to the interior of the same for cleansing purposes. Said upper end or mouth is provided with an inwardly directed circumferential shoulder 3, recessed at its top for receiving an annular washer or other suitable packing 4 for purposes hereinafter explained.

For containing the coffee or other grounds is provided a suitable receptacle 5 comprising an upper enlarged portion 6 having a central depending stem 7. Preferably the enlarged portion is cylindrical and of an appropriate size so as to just fit within the open mouth of the container 1. Furthermore, said receptacle 5 provides at its upper end a circumferential rim bent downward at its outer edge and adapted to seat upon the packing 4 in the shoulder 3. The length of the stem 7 is so proportioned that the same will terminate closely adjacent the bottom of the container 1, but will not engage the same, so that the receptacle 5 rests positively upon the shoulder 3 and is carried entirely thereby. In the preferred construction of the receptacle, the bottom 8 of the enlarged portion 6 tapers inwardly and downwardly to the stem 7, and at the bottom of said tapered portion within the same the stem is perforated as at 9. At its bottom, the stem is preferably enlarged as at 10, said enlargement having a closed bottom 11 and providing an interior chamber 12 to which communication may be had through one or more holes 13 in the side thereof. Between said chamber 12 and the perforation 9 from the enlarged upper end of the receptacle, the stem 7 is tubular providing an interior passage 14. It may here be noted that the hole 13 is a slight distance above the bottom 2 of the container 1, and that communication is afforded between said container and the interior of the enlarged end 6 of the receptacle 5 by way of the hole 13, chamber 12, passage 14 and perforation 9.

Within the receptacle 5, the stem 7 extends upwardly, the passage 14 therein being closed above the perforations 9. Above the plane of the top of the receptacle 5 the stem is reduced as at 15 and screw-threaded. An appropriate top or strainer plate 16 may be screwed on this upper reduced end 15 closing the receptacle to the escape of grounds, but permitting the passage of water or the like. A removable disk-like bottom plate 17 is provided for said enlarged upper portion 6 of the receptacle 5 adapted to hold the grounds above the tapered bottom 8. Said bottom plate provides at its center a sleeve 18 extending longitudinally of the stem, surrounding the same. Said sleeve is long enough below the plate to engage the bottom 8 of the receptacle so as to support the center of said plate, and the periphery of the plate rests upon the bottom 8 where the same joins with the side wall. The lower end of said sleeve is serrated as at 19 so as to admit the passage of water through the perforations 9 in the stem. Furthermore said plate is made perforate by a plurality of fine holes 20 through which water may pass, but too fine for grounds to sift through. In this manner the grounds are contained in a closed chamber through which water may pass as hereinafter described.

Adapted to be seated on the top of the container 1, imperviously in peripheral engagement with the washer or packing 4 is a hollow top 21, and pivotally carried by the container 1 is a bail 22 adapted to be swung over the top 21 and provided with a clamping screw 23 adapted to engage at its lower free end the top 21 and seat the same imperviously in position. As stated, the top 21 is hollow, providing an interior chamber 24 into which water may be introduced upwardly through the bottom closure 25 thereof by way of a trap 26. At one side of the top 21 near its bottom is an outwardly directed nipple or nozzle 27 through which any liquid introduced into the chamber 24 may be drawn off. Referring especially to Fig. 1, there is shown a spout 28 carried upon said nipple 27 and extending outwardly from the percolator. At its outer end said spout is divided into diverging branches 29, 29, said branches opening downwardly and being adapted to discharge the contents from the chamber 24 of the percolator into two cups 30, 30 at the same time.

At the upper end of the top 21, is preferably formed a dome 31, and from said dome leads a whistle or other signal 32 adapted to make a noise when steam passes therethrough.

In operation, water is first introduced into the container 1, the quantity thereof being governed by the number of cups intended to be filled. Coffee or the like is then put in the receptacle 5 upon the removable bottom or plate 17, and the top plate 16 screwed into position to inclose said coffee. With the receptacle 5 placed in position within the container 1, the top 21 is seated upon the packing 4 and the bail 22 swung up over the same and the top clamped in position by turning upon the screw 23. Having the spout 28 positioned so its branches 29 overlie the cups which it is desired to fill, a fire or other suitable source of heat is placed beneath the percolator and the water in the container 1 caused to boil. The steam formed in this operation is entrapped within the container 1, and as the pressure rises, the water is forced through the hole 13, up through the stem 7 and into the enlarged portion 6 of the receptacle 5 beneath the false bottom plate 17. As the pressure rises still farther the water is forced on upward through the coffee and through the trap 26 of the hollow top 21, removing the essence of the coffee in its passage therethrough. The beverage thus formed flows from the chamber 24 of the top through the spout and branches into the cups. As heat is supplied further to the percolator steam continues to be formed and follows the water upwardly through the stem 7 and into the chamber 24 of the top, passing upwardly through the whistle 32 and emitting sounds to attract attention and indicate that the beverage is prepared and served.

Where it is desired to form a greater supply of the beverage than is to be served at one time, I may replace the spout with a reservoir 33, see Fig. 6, into which the beverage will pass from the nipple 27. The beverage may be drawn from the reservoir through a suitable faucet 34 at its bottom. Preferably the side of the reservoir 34 next to the percolator is shaped to correspond to the shape of the percolator and thus be in close contact therewith, suitable hooks 35 being provided for holding the same in this position, it being obvious that the contents of the reservoir may be kept hot for a considerable time by being supplied with heat radiating from the percolator.

Having thus described the invention, what I claim is,—

1. In a percolator, the combination of a fluid container, a receptacle having an enlarged upper end adapted to receive grounds and a depending stem adapted to supply water to the grounds from the container, said receptacle having a circumferential rim at its top adapted to seat on the top of the container, whereby said receptacle depends entirely within said container and seals the top thereof, a hollow top overlying said receptacle and retaining the same seated upon the top of the container, said top adapted to seat imperviously in peripheral engagement with the top of the container and having a trap in its bottom through which the beverage may pass from the receptacle into said top, and means for discharging the beverage from said top.

2. In a percolator, the combination of a fluid container, a receptacle having an enlarged upper end adapted to receive grounds and a depending stem adapted to supply water to the grounds from the container, said receptacle having a circumferential rim at its top adapted to seat on the top of the container, whereby said receptacle depends entirely within said container and seals the top thereof, a hollow top overlying said receptacle and retaining the same seated upon the top of the container, said top adapted to seat in peripheral engagement with the top of the container and having a trap in its bottom through which the beverage may pass from the receptacle into said top, and a spout for discharging the beverage from said top having diverging branches whereby the beverage may be distributed into a plurality of receptacles.

3. In a percolator, the combination of a fluid container, a receptacle having an enlarged upper end adapted to receive grounds and a depending stem adapted to supply water to the grounds from the container, said receptacle having a circumferential rim at its top adapted to seat on the top of the container, whereby said receptacle depends entirely within said container and seals the top thereof, a hollow top overlying said receptacle and retaining the same seated upon the top of the container, said top adapted to seat imperviously in peripheral engagement with the top of the container and having a trap in its bottom through which the beverage may pass from the receptacle into said top, means for discharging the beverage from said top, and a signal from the hollow top adapted to be operated by steam escaping from said trap after discharge of the beverage therethrough.

STANISLAO CILETTI.

Witnesses:
HOWARD P. KING,
JANET A. AYERS.

Copies of this patent may be obtained for five cents each, by addressing the "Commissioner of Patents, Washington, D. C."